United States Patent [19]

Mixon, Jr.

[11] 4,246,039

[45] Jan. 20, 1981

[54] KAOLIN CLAY PROCESSING

[75] Inventor: Robert B. Mixon, Jr., McIntyre, Ga.

[73] Assignee: Engelhard Minerals & Chemicals Corporation, Menlo Park, Edison, N.J.

[21] Appl. No.: 1,898

[22] Filed: Jan. 8, 1979

[51] Int. Cl.³ .................................................. C09C 1/42
[52] U.S. Cl. ..................................... 106/288 B; 106/72
[58] Field of Search ........................... 106/288 B, 72; 204/180 R

[56] References Cited

U.S. PATENT DOCUMENTS

| | | | |
|---|---|---|---|
| 3,309,214 | 3/1967 | Podschus et al. | 106/288 B |
| 3,383,438 | 5/1968 | Allegrini et al. | 106/288 B |
| 3,586,523 | 6/1971 | Fanselow et al. | 106/288 B |
| 3,798,044 | 3/1974 | Whitley et al. | 106/288 B |
| 4,003,819 | 1/1977 | Kunkle et al. | 204/180 R |
| 4,048,038 | 9/1977 | Kunkle et al. | 204/180 R |

Primary Examiner—Edward J. Meros
Attorney, Agent, or Firm—Inez L. Moselle

[57] ABSTRACT

Manufacture of white calcined kaolin clay pigments from dilute dispersed aqueous suspensions of wet-processed hydrated kaolin clay is normally an energy intensive operation because heat and electrical energy are consumed in dewatering the suspensions and additional heat of substantial magnitude is required to calcine the resulting dry dewatered clay material. Energy efficiency is improved by dewatering the dilute aqueous suspension of hydrated kaolin clay in stages to provide dry pulverized calciner feed. An initial portion of the water in the dispersed aqueous suspension is removed in an electrofilter operated to produce a more concentrated but still fluid dispersed suspension of hydrated kaolin. The remainder of the liquid water is then removed from the suspension by spray drying. Preferably the suspension of hydrated kaolin fed to the electrofilter is preheated (and, optionally, some water evaporated) by direct heat exchange with hot exhaust gases from a clay calciner used to remove water of hydration from the kaolin.

12 Claims, 1 Drawing Figure

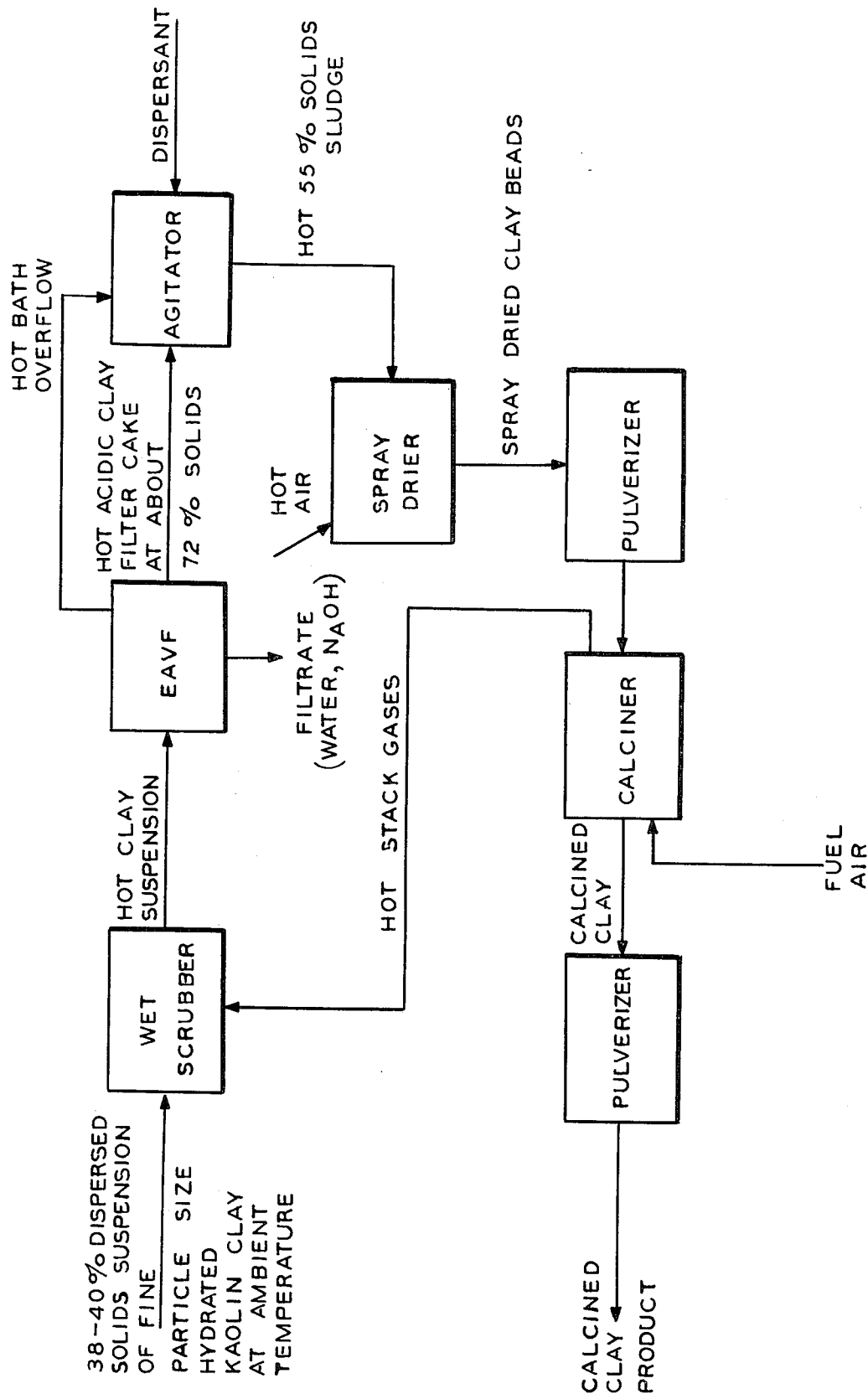

KAOLIN CLAY PROCESSING

BACKGROUND

1. Field of the Invention

The present invention relates to the manufacture of high brightness (white) low abrasion calcined clay pigments from crude (unrefined) hydrated kaolin clay ores. Generally, such processes include an initial "wet processing" of the hydrated clay to refine the clay, followed by removal of substantially all of the water introduced during wet processing to provide dry pulverulent fine particle-size hydrated kaolin which is then heat treated (calcined) at elevated temperature to remove water originally chemically associated with the clay particles and thereby impart a spectrum of desirable functional properties not possessed by refined hydrated kaolin clay pigments. In particular, the invention is directed to reducing the energy required to produce such pigments.

High brightness low abrasion calcined kaolin clay are known in the art. The product commercially available as ANSILEX ® clay is an example. This pigment is now widely used as a paper filling pigment and it also finds application in paper coating use.

Methods for preparing calcined kaolin clay pigments are described in the following: U.S. Pat. No. 3,941,872: U.S. Pat. No. 3,798,044; U.S. Pat. No. 3,586,523; U.S. Pat. No. 3,519,453; U.S. Pat. No. 3,383,438; U.S. Pat. No. 3,171,718; U.S. Pat. No. 3,309,214; U.S. Pat. No. 3,021,195; U.S. Pat. No. 3,058,671; U.S. Pat. No. 3,014,836; British Pat. No. 1,181,491. The processing described in these patents encompasses variations in the feed material to the calciner and calcination conditions to produce calcined clay pigments of desired brightness and low abrasivity. For example, a fine particle-size fraction of a hard kaolin clay crude (ememplified by certain deposits of gray Gerogia Kaolin) is employed in practice of the process described in U.S. Pat. No. 3,586,523; fine particle-size fraction mechanically delaminated kaolin obtained by delaminating chunks of large booklets of kaolinite and fractionating to remove the fine particle-size fraction is used in some of the other processes for providing low abrasion pigments.

In general, processes for producing low abrasion white calcined clay pigments are characterized by the fact that substantial amounts of water must be added to the dry crude clay to permit the crude clay to be refined ("wet-processed") before the clay is charged to a calciner. Wet processing includes, but is not limited to, placing the crude clay into the form of a fluid aqueous suspension, removing coarse grit and then recovering a desired fine particle-size fraction of hydrated clay. The fine particle size is a requirement inter alia for low abrasiveness of the ultimate calcined clay product. Fractionation is conventionally carried out by centrifugation of a chemically deflocculated (dispersed) aqueous suspension of the degritted clay. For fractionation to be effective to recover a fine particle-size fraction (generally, 90% finer than 2 microns e.s.d. or finer), the feed to centrifuge must be well dispersed and sufficiently dilute; for example, below 50% clay solids. The fine size fraction is obtained in the form of a dispersed suspension as a centrifuge overflow and is at somewhat lower solids than the feed to the centrifuge. For example, the fine particle size fractions may be recovered at 35 to 40% solids from a centrifuge charged with feed slurry at 45–50% solids.

All liquid water introduced during wet processing of kaolin clay used in the manufacture of calcined clay pigments must be removed from refined kaolin clay prior to calcination. The reason is that the calciner must be charged with dry pulverized clay in order to manufacture a pigment having reasonably low abrasivity; for example, a Valley Abrasion Index below 200, preferably below 100, and most preferably appreciably below 50. The water contained in a slurry of wet processed kaolin presents a formidable filtration and/or evaporative load in a large scale commercial operation. For example, a plant operating to produce 40 tons per day of dry pulverized calciner feed from wet processed feed slurry at 40% solids, would be faced with the problem of removing 60 tons of water per day. This is by no means a simple or inexpensive task. When the clay is composed of extremely fine particles, for example, 90% finer than 1 micron, dispersed aqueous suspensions of the kaolin will form dense impermeable cakes resistant to further efficient removal of water when processed in conventional dewatering equipment such as cyclones, rotary vacuum filters, or plate-and-frame filters. To facilitate dewatering, an acidic flocculating agent must be added. However, even when the suspensions are flocculated, the conventional solids-liquids separation equipment removes only limited amounts of water from suspensions of fine particle-size fractions of kaolin clay such as required as the source of low abrasion calcined clay pigments. Furthermore, filtration rates are low compared with rates achieved using coarser clay particles. However, use of the large clay particles would not be suitable for manufacture of low abrasion calcined kaolin pigments.

Water remaining in the solid filter cakes obtained by rotary vacuum or plate-and-frame aqueous filtration of suspensions of fine particle-size kaolins can be removed by thermal means. This is conventionally done by adding a dispersant (deflocculating agent) to transform the cake into a fluid slurry from which water is removed by spray drying. However, such practice results in the introduction of undesirable salts unless expensive washing is practiced.

Conventional dewatering equipment such as mentioned above consumes considerable energy when utilized in large-scale commerical plants. Considerable electrical energy is called for in the operation of rotary filters, cyclones, and the pumps. Fossil fuel is needed for spray drying. The electrical energy requirement could be reduced by omitting the filtration step and directly spray drying the dispersed slurry of wet processed clay to remove essentially all water. This would also avoid excessive salts in the dried clay; however, fuel energy requirements would be increased significantly.

With the escalating cost of fuel and concern for its availability, there is an obvious need for reducing the energy expended in manufacture of calcined clay pigments, especially so because the calcination operation that follows dewatering must be carried out at elevated temperatures, generally above 1500° F., utilizing equipment that is usually limited in energy efficiency because of the need to avoid local overheating which will result in undesirable residue and/or abrasiveness in the finished product. Given the necessity for providing high brightness calcined clay pigments having low abrasion values and limitations in processing options resulting from these requirements, conventional clay dewatering technology has not been adequate to permit striking improvements in the energy efficiency of processing schemes.

2. Prior Art

There is a long history of attempts to dewater slips of clays, inclusive of kaolins, by filters of various designs utilizing electrokinetic phenomena such as electrophoresis and electroosmosis. Reference is made to U.S. Pat. No. 1,229,203 to Schwerin (1917) which is directed to electrically dewatering dispersed suspensions of fine particle-size fractions of kaolin clay. Recently, interest in electrofilters has revived in response to the desire of certain consumers of hydrated (uncalcined) kaolin clay pigments to purchase shipments of clay pigments in the form of dispersed fluid high solids (e.g., 70%) slurries instead of dry powders while avoiding certain expenses entailed in the conventional technique for preparing such concentrated slurries. Electrofiltration was envisioned simply as a means for avoiding the expense incurred in removing water from a substantial amount of clay by spray drying and subsequently reintroducing water into previously dried clay by mixing it with a filter cake obtained, for example, by conventional rotary vacuum filtration. Reference is made to the following patents: U.S. Pat. No. 4,003,811; U.S. Pat. No. 4,003,819; U.S. Pat. No. 4,048,038; and French Demande Pat. No. 2,354,802. In other words, electrofiltration is now comtemplated simply as a technique for transforming a 60% solids flocculated (acidic) filter cake into a 70% solids deflocculated fluid slurry of hydrated kaolin clay suitable for shipment to a consumer.

It has been commercial practice to utilize the heat in calciner stack gases to preheat clay suspensions before drying them in spray dryers.

To the best of my knowledge, the general concept of incorporating an electrofilter as part of an improved system for producing calcined clay is novel, as are the specific concepts of preheating feed to an electrofilter with hot calciner exhaust gases and utilizing the electrofilter to dewater relatively dilute, e.g., 40% solids, slurries of dispersed kaolin to levels suitable for spray drying, e.g. 55% to 60% solids.

THE INVENTION

A general object of the invention is to reduce significantly the energy needed to produce fine particle-size, preferably low abrasion, white calcined pigments from crude kaolin clays. A more specific objective is to improve energy efficiency in a continuous system for producing calcined kaolin clay from wet processed crude kaolin clay. An object of a preferred embodiment is to utilize heat normally wasted in stack gases from clay calciners to further improve energy efficiency of the dewatering operation carried out to provide dry pulverized clay calciner feed.

Stated briefly, the essence of my invention resides in electrically dewatering a relatively dilute, e.g., less than 45% solids, deflocculated wet-processed suspension of fine particle-size hydrated kaolin clay to remove a portion, but not all, of the water and provide a concentrated deflocculated aqueous suspension sufficiently fluid to be spray dried; for example, 55% to 60% solids, and spray drying such concentrated deflocculated suspension to remove substantially all water and provide pulverulent beads. The beads are then pulverized, calcined and repulverized in conventional manner to produce a calcined clay pigment.

In a preferred embodiment of the invention, the clay suspension that is fed to the electrofilter is preheated and optionally, but preferably, partially evaporated by direct heat exchange with hot stack exhaust from a clay calciner (kiln) before the clay suspension is charged to the electrofilter. The use of heated feed reduces significantly the electrical energy demands of the electrofilter, and the preconcentrated slurry is discharged from the electrofilter and fed to the spray dryer at elevated temperature, thereby improving energy efficiency in the spray drying operation. In other words, considerable heat energy, normally wasted in operation of a calciner, is now utilized in removing water from material subsequently charged to a calciner.

A presently preferred electrofilter is the electrically augmented vacuum filter hereinafter designated "EAVF". This type of filter is described in French Demande Pat. No. 2,354,802 (U.S. Pat. No. 4,107,026), the entire disclusure of which is incorporated herein by cross-reference. In commercial practice, an automatic apparatus, such as illustrated in FIGS. 16 to 20 of French Pat. No. 2,354,802, can be used. An EAVF system comprises a tank, a series of self-contained alternating cathodes and anodes in predetermined relationship in the tank, means for continuously charging a feed slurry to the tank between the anodes and cathodes, means for continuously discharging overflow of slurry from the tank in a manner such as to maintain the cathodes and anodes submerged in the slurry in the tank, and means for applying a D.C. current to the electrodes. The cathodes have liquid-previous, clay-imprevious walls covering a supporting grid and are associated with a source of vacuum to fill the hollow interior of the cathode and a pump to withdraw filtrate through the cathode at a predetermined rate. Means are provided for scraping and collecting clay filter cake depositing on the anodes and for blending the filter cake with bath overflow in predetermined proportions.

Practice of my invention provides the potential for achieving dramatic improvements in energy utilization in the manufacture of calcined clay pigments. It has been estimated, for example, that energy efficiency in large scale commercial installations utilizing about 40% solids wet processed kaolin feed will be five-fold better when the clay is dewatered to 55% solids on an EAVF preheated with hot stack gases from a calciner and then spray dried, than it would be if the all dewatering were accomplished in the same spray dryer.

A feature of my process is that the clay calciner feed can be obtained from a dispersed wet processed clay suspension without addition of clay flocculants.

The manner in which the foregoing and other objectives are achieved in accordance with the present invention, will be better understood in view of the following detailed description and accompanying drawing which is a diagrammatic representation of a preferred system for manufacturing calcined clay pigments in accordance with this invention.

PREFERRED EMBODIMENTS

Clay crudes useful in producing white calcined clay pigments having low abrasion are described in U.S. Pat. No. 3,586,523, the entire disclosure of which is incorporated by cross reference. As described in that patent, the crude clay is blunged, degritted by screens or in drag boxes, deflocculated using conventional clay deflocculants (polyanionic salts such as sodium silicate, tetrasodium pyrophosphate) and fractionated by centrifugation to recover the desired fine particle-size fraction of the crude clay in the form of a deflocculated aqueous suspension. Typically, the wet processed fine particle-size fraction of kaolin clay is at least 90% by weight finer than 2 microns, equivalent spherical diameter. When very low abrasion values (Valley Abrasion Index of 100 or below) are desired, the fine clay may be 90% by weight, or more, finer than 1 micron. To produce very low abrasion calcined clay, hard kaolin crudes, such as certain gray Georgia crudes are used, and these crudes are degritted and fractionated to recover a fraction that is at least 90% by weight finer than 1 micron.

To minimize dewatering costs and maximize energy efficiency, the clay slurry is charged to the centrifuges at the highest possible solids that can be used while achieving an effective particle size cut. Typical centrifuges are fed at about 40–50% solids (weight basis) and the centrifuge overflow containing the desired minus 2 micron cut is recovered at about 38% solids. In some cases, for example, when the clay is beneficated by flotation or magnetic separation, it may be necessary to charge the centrifuge with clay at lower solids, for example, 25% solids. In other instances, it may be feasible to use slurries containing up to 50% solids. This will depend on the nature of the clay and impurities associated with the clay, the amount and type of dispersant, the design of the centrifuges and the efficiency of fractionation that is sought.

It is also within the scope of the invention to use fine particle-size mechanically delaminated clay obtained by wet processing coarse size fractions of clay crudes, the wet processing including optional magnetic purification, mechanical delamination by grinding with abrasive or non-abrasive milling media followed by wet classification to recover a fine size fraction of mechanically delaminated clay as a dispersed aqueous suspension. The entire disclosures of U.S. Pat. No. 3,798,044 and U.S. Pat. No. 3,171,718 are incorporated herein by cross-reference.

The specific steps that are used in wet processing may include one or more of the following, or possibly other operations: bleaching, flotation, magnetic purification, selective flocculation, delamination. Irrespective of the crude clay that is used and the specific wet processing steps that the crude clay undergoes before it is dewatered, it is preferable to preheat the dispersed slurry of wet processed fine particle-size clay that is to be charged to the electrofilter to improve the operation of the filter. To improve energy efficiency, it is preferable to preheat slurry by direct heat exchange with exhaust gases from a calciner, for example, the rotary clay calciner described in U.S. Pat. No. 3,383,438. This type of calciner operates with counter-current flow of hot air and clay feed; stack gases are typically in the range of about 800° F. to 1000° F. Exhaust gas from such calciner can be used to preheat slurry from ambient temperature to a temperature above 100° F., preferably, to a maximum temperature below the boiling point and sufficient to evaporate some water, for example, to increase solids by 2 to 5%, weight basis. The amount of heat added to the slurry will obviously depend on the temperature of hot exhaust and the proportion of slurry to hot exhaust and efficiency of heat transfer. A presently preferred heat-exchanger system is a ventur-type wet collectro (scrubber), exemplified by the apparatus known as a "Kinpactor". The standard AAF Kinpactor, described in Service Bulletin DC 174 of American Air Filter Company, Inc. may be employed. The Type V Kinpactor, described in Dust Control Bulletin No. 305-A of the same company is preferred when the hot calciner exhaust contains an appreciable load of particulates. Dilute slurry of fine particle-size clay is heated by hot calciner exhaust on a continuous basis in such apparatus by accelerating the exhaust gases to high velocity in the venture-shaped throat section of the cyclonic separator. Clay slurry is introduced into the gases ahead of the throat, thereby atomizing the slurry. The resulting hot slurry is separated from cooled exhaust gases and is passed into a holding or surge tank and then immediately or substantially immediately charged in heated condition to the electrofilter to minimize loss of heat. The AAF Kinpactor has been used to heat 36 to 38% solids clay slurry to 125° to 140° F. using stack gases at about 900° F. from a countercurrent flow rotary calciner.

One embodiment of an EAVF filter useful in practice of the invention, is described in FIGS. 16 to 20 of the French patent. This EAVF comprises a tank, a series of self-contained alternating cathodes and anodes in predetermined parallel spaced relationship in the tank with their planar electrode surfaces parallel to each other, means for continuously discharging overflow of slurry from the top of the tank, means for continuously charging of slurry of clay containing an electrolyte (clay dispersant) between the anodes and the cathodes at a rate such that an excess of slurry will continuously pass out of the tank as an overflow and thereby to submerge the anodes and the cathodes; means for circulating slurry in the tank, and means for applying a D.C. current to the clay suspension in the tank. Each cathode is a self-contained hollow structure having planar surfaces and is normally submerged in the slurry in the tank. The cathodes have liquid-previous walls; in particular, a liquid-previous, but clay-imprevious filter cloth, covering a supporting grid. A source of vacuum connected to the hollow cathode causes the liquid phase (filtrate) of the slurry to fill the hollow interior of each cathode. Filtrate is pumped from the filtrate-filled hollow cathodes at a controlled predetermined rate. When a D.C. current is applied to the slurry in the tank, the liquid phase of the slurry disassociates. As a result, hydrogen gas, sodium ions (from the clay dispersant) and hydroxide ions form at the cathodes. Oxygen and hydrogen ions accumulate at the anodes. When an anolyte such as sodium chloride circulates throughout the anode to protect the anode, chlorine gas will also accumulate at the anodes. The extent of disassociation is determined by the controllable density of the electric current supplied to the electrodes. Acid at the anodes causes the originally deflocculated clay to flocculate and collect on the planar surface of each submerged anode opposite the planar liquid permeable surface of an adjacent cathode.

The apparatus includes an overhead traveling carriage equipped with hoists to raise an anode vertically out of the slurry and return it vertically to the slurry. Doctor blades associated with the traveling carriage are constructed to scrape the clay filter cake adherent to the planar surface from both anode surfaces while the anode is being returned to be resubmerged in the suspension. Scraped clay is collected on a filter belt. When the filter cake has been removed in this manner from one anode (which is then resubmerged in the tank), the carriage, with associated scraping and collection means, moves on to hoist the next anode and repeat the cake removal and collection operation.

As mentioned, the electrofilter apparatus is provided with means to provide a continual overflow of slurry from the tank, and means for continually feeding clay slurry to the tank. This arrangement assures maintenance of full submergence of all electrodes (except an anode that is being lifted). The means for providing continual overflow takes the form of an edge at the top of the tank that communicates with a launder. Means are provided to charge overflow feed from the launder to either a holding tank or to a blending tank.

Since hydroxyl ions accumulate at the cathode during operation of the EAVF, highly alkaline filtrate (pH 11 to 13) is continuously withdrawn from the tank by pumps carrying filtrate through the evacuated cathodes. Meanwhile, acidic clay is being concentrated as cakes on the anodes and removed therefrom, as described hereinabove, while a portion of deflocculated slurry in the tank is continuously being withdrawn as an overflow. The current density is controlled to achieve a desired balance between the migration of clay to the anodes and removal of clay through the hollow cathodes.

Slurry is charged to a EAVF as a fluid dispersed (deflocculated) aqueous suspension. Typically, pH is in the range of 6 to 9.5. Deflocculants include, but are not limited to, sodium hydroxide, sodium condensed phosphate, sodium silicate, sodium carbonate and mixtures thereof. Conventional amounts of dispersants are present in the dispersed slurry of clay fed to the elctrofilter. For example, the slurry may contain 3 to 6 pounds of commercial sodium silicate solution such as O ® brand. Clay solids of feed slurries are usually in the range of 25% to 42%, weight basis. Filter cakes scraped from the anodes are generally at 75% to 82% solids and are distinctly acidic. Overflow is generally at somewhat lower solids than feed slurry and at slightly higher pH. For example, feed slurry of 40% solids at pH 9.0 may result in bath overflow of 38% solids at pH 9.5. Filter cake is charged to an agitated blending tank such as a Cowles mixer, along with a quantity of bath overflow preselected to produce a slurry of desired solids for spray drying, for example, a 55% solids slurry. Normally, additional clay dispersant, for example, 41 lbs/ton O ® sodium silicate, is added to the slurry formed by mixing acid filter cake with bath overflow. The additional dispersant may be required to provide a slurry sufficiently fluid to be handled in a spray dryer. During operation of an EAVF, the clay charge increases in temperature. Thus, clay feed introduced at about 140° F. will be discharged at about 140° F. since heat losses to the environment will be offset by temperature increases incident to operation of the electrofilter.

While the invention has been described in connection with the use of an electrically augmented vacuum filter with planar-surfaced anodes that are lifted vertically out of submergence from the slurry for removal of filter cake, it will be clearly understood that other electrode configurations and cake removal techniques can be employed. For example, the anode can take the form of a rotating disc, illustrated in FIG. 11 of the French Patent. The anode can take the form of a rotatable drum. The essential and limiting characteristics of the electrofilter are that it is capable of dewatering a fairly dilute slurry of kaolin that is in dispersed condition and operates to discharge a filter cake and dispersed bath overflow from the filter tank in a manner such that the cake and bath overflow can be combined on a continuous basis.

Irrespective of the specific design of the electrofilter that is employed, the partially concentrated effluent slurry, with added dispersant, is spray dried with hot air to remove substantially all of the remaining water and produce small beads (so-called microspheres). Typically, spray dryers are operated to discharge dried clay beads at about 225° F. to 250° F. Spray dryers useful for the purpose include those in which the slurry is atomized by a high speed wheel and those in which nozzles are used. Typically spray dried beads are from 5 to 150 microns and contain less than 2%, usually less than 1%, water on a weight basis. The microspheres are then pulverized, as described for example, in U.S. Pat. No. 3,586,523, before being charged to a calciner.

A suitable calciner is the rotary unit operated with a "shielded" flame and counter-current flow of pulverized clay and combustion gases, as described in U.S. Pat. No. 3,383,438, the entire disclosure of which is incorporated herein by cross-reference. Normally calciner discharge is pulverized one or more times. Optionally, calciner discharge is classified by wet or dry methods and oversize is discarded.

Brightness and abrasivity of calcined clay pigments vary inter alia with the nature, particle size, and source of calciner feed, brightness of calciner feed, as well as the operation of the calciner, including temperature and residence time of the clay in the calciner. Generally, low abrasion calcined clay pigments have Valley Abrasion Index values below 200, preferably below 100, and most preferably below 50 mg. as determined by the standard TAPPI method, Procedure 65. Brightness value is usually above 88%, preferably at least 90%, and most preferably above 90% as measured by TAPPI method T-646. Depending on brightness, abrasion value and other properties, the fine particle-size clay products are useful as pigments for coating paper, filling paper, or as extenders in paints.

The following examples are given for illustrative purposes.

Crude kaolin clay from a mine in Georgia was used in tests illustrative of practice of the invention. The crude clay was an ultrafine particle-size (hard) kaolin clay. The crude clay was blunged in water and degritted on sand boxes. Sand box overflow was then formed into a 45–50% dispersed solids by addition of 4 lbs. O ® sodium silicate and sodium hydroxide sufficient to bring pH to about 9. The slurry was fractionated in a conventional solid bowl centrifuge and overflow clay (90% finer than 1 micron) was recovered at 38% to 40% solids. The overflow was screened to remove wood and other debris.

In tests carried out in accordance with the present invention, the electrofilter was a 24 ft.$^2$ EAVF Unit with two anodes spaced between three hollow cathodes. Each anode had a surface of 6 sq.ft. on both sides and was provided with means for circulating an anolyte solution (sodium chloride) within each anode to protect the anode. The cathodes were made of stainless mesh and were covered with propylene filter cloth. The cathodes and anodes were placed in a dispersed slurry (38% to 40% solids) of clay to be filtered. Cathode-anode gap was about 1'. Each cathode was maintained under vacuum (15' Hg.). Carriage means were provided above the bath for mechanically lifting each anode individually from the slurry bath and were associated with doctor blades for scraping filter cake from both sides of the lifted anode. A D.C. voltage was applied to the electrodes, resulting in current flow through the slurry bath.

Kaolin clay particles (negatively charged) concentrated at the anode under the influence of the electrical force. Dispersant anions (e.g., silicate ions) also migrated to the anode and acidic clay was concentrated to about 75% to 82% solids on both sides of an anode. After operation for about 6½ minutes, the anode was mechanically lifted from the slurry bath and doctor blades removed cake from both sides of the anode. Meanwhile, clay cake was forming on the other anode. When the anode was returned down into the slurry, a portion of the slurry overflow was diverted and collected as bath overflow. The bath overflow, which was mixed in suitable proportion with the cake scraped from the anodes and additional dispersant (3 lbs/ton O®ˢ sodium silicate) to form a slurry (55% solids) amenable to spray drying. The action of the current in conjunction with the evacuation of the stationary cathode members resulted in steady flow of filtrate to the cathode where it was removed by pumps. Hydroxyl ions flowed in the filtrate to the cathode and the filtrate was strongly alkaline (typical pH was in the range of 11 to 13). Hydrogen gas was removed with the filtrate.

The 55% solids slurry obtained from the EAVF was spray dried into hot air to discharge beads at about 225° F. The beads were pulverized as described in U.S. Pat. No. 3,586,523, calcined in a rotary calciner described in U.S. Pat. No. 3,586,523, and repulverized.

In test runs carried out with 36 to 38% solids slurry at ambient temperature (about 60° F.), slurry feed rates in the range of about 20 pounds per minute, filtrate flow rate between about 9 to 11 pounds per hour, cake solids between 74 to 76%, bath solids between about 37 to 39%, and D.C. voltage applied at about 50 volts, current flow ranged between 160 to 210 amperes. Killowatt hours per pound of water removed ranged from 0.031 to 0.049.

In other tests, similar 36 to 38% solids clay feed slurry was preheated to about 128° F. on a continuous basis in an AAF Kinpactor Kinetic Scrubber (supra) using hot exhaust gases at about 900° F. from a rotary clay calciner such as described in U.S. Pat. No. 3,586,523. The exhaust gases from the kiln contained small amounts of particulates, including fine calcined clay particles, which were introduced into the clay slurry during treatment in the kinetic scrubber. Hot exhaust from the kiln heated the slurry to about 140° F. and evaporated sufficient water to remove about 3% by weight of the water in the slurry. Hot clay slurry, at about 41% solids, was discharged from the scrubber, was fed to a surge tank, and immediately charged to the EAVF to minimize heat loss. By charging the EAVF with preheated 41% solids slurry, under conditions substantially as described for the operation using slurry at ambient temperature, current flow ranged between about 150 to 250 amperes and killowatt hours per pound of water removed ranged from 0.013 to 0.022. Thus, energy normally wasted in the operation of the rotary calciner was used to bring about a significant decrease in power consumption in the operation of the EAVF. When the hot filter cake scraped from the anodes was blended with hot bath overflow to form the 55% solids spray dryer feed there was a further reduction in power consumption since less energy was needed to operate the spray dryer.

Representative products of calcined clays produced in the test runs described above had G.E. brightness values in excess of 90% and Valley Abrasion Index below 50.

Based on estimates of current costs for electrical energy and fuel oil and converting electrical energy to thermal equivalents, it was determined that the current practice of spray drying wet-processed clay feed required almost 60% more thermal energy than would be needed to dewater to 55% solids by feeding preheated slurry to the EAVF and then spray drying to remove the water in the slurry.

I claim:

1. In a process for producing white fine-particle size calcined kaolin pigment particles which comprises subjecting impure crude hydrated kaolin to wet processing in a manner such as to provide a dilute deflocculated fluid suspension in water of a fine particle size fraction of kaolin clay, dewatering said suspension by spray drying or by filtration followed by spray drying and provide dry pulverulent hydrated kaolin clay in the form of beads, pulverizing said beads and calcining the pulverized beads to remove water of hydration from the pulverized beads, thereby providing the desired calcined kaolin clay pigment particles; the improvement to improve the energy efficiency of said process which comprises: removing a part of the water from said dilute fluid deflocculated suspension of fine particle size hydrated clay by charging said dilute deflocculated fluid suspension at a pH in the range of 6 to 9.5 to an electrofilter operated to remove sufficient water and to produce a deflocculated partially dewatered suspension at a predetermined controlled solids content suitable for spray drying and thereafter spray drying said deflocculated partially dewatered suspension to remove the remainder of the water and form spray dried beads before pulverizing and calcining the clay, said deflocculated suspension having been charged to said electrofilter without addition of a flocculating agent thereto and without prior partial dewatering by conventional filtration, said electrofilter being an electrically augmented vacuum filter operated with alkaline bath overflow and producing an acidic filter cake as an anodic deposit which is mixed with bath overflow and additional deflocculating agent, if necessary, to produce said deflocculated partially dewatered suspension.

2. The process of claim 1 wherein said dilute deflocculated fluid aqueous suspension of fine particle-size hydrated kaolin clay that is charged to said electrofilter contains less than 45% solids and is partially dewatered to 50% to 60% solids in said electrofilter and said fine particle size hydrated clay is composed of particles which are at least 90% by weight finer than 1 micron.

3. The process of claim 1 wherein said dilute deflocculated aqueous suspension of fine particle-size hydrated kaolin clay contains about 25% to 45% solids and is dewatered to about 50% to 60% solids in said electrically augmented vacuum filter, said deflocculated suspension that is charged to said filter containing sodium silicate as a deflocculating agent and sufficient sodium hydroxide to provide a pH of about 9.

4. The process of claim 1 wherein said dilute deflocculated aqueous suspension of fine particle-size hydrated kaolin clay is obtained as an overflow product from a centrifuge at ambient temperature and, before it is charged to said electrofilter, it is heated to a temperature below the boiling point with hot exhaust gas from a calciner used to remove water of hydration from the pulverized hydrated kaolin and said heated centrifuge overflow product is dewatered in said electrically augmented vacuum filter.

5. The process of claim 4, wherein said centifuge overflow product is heated with said hot exhaust gases under conditions to evaporate water from said centrifuge overflow product.

6. The process of claims 4 or 5, wherein the dilute deflocculated aqueous suspension of fine particle-size hydrated kaolin clay is heated with said exhaust gases by accelerating said exhaust gases to high velocity in the venturi-shaped throat section of a cyclonic separator and said suspension is introduced into said gases ahead of said throat to atomize the clay suspension, the resulting heated clay slurry is separated from the heat depleted exhaust gases and passed in heated condition to said electrofilter.

7. In a process for producing a white low abrasion fine particle-size calcined kaolin clay pigment particles wherein a fine particle-size fraction of hydrated hard kaolin clay is obtained from a crude clay in the form of a deflocculated aqueous suspension of about 35% to 40% solids, said fraction being composed of particles at least 90% by weight of which are finer than 1 micron, said suspension containing a dispersant effective amount of polyanionic salt, and substantially all liquid water is removed from said suspension by spray drying or by filtration followed by spray drying to provide dry pulverulent hydrated clay material which is pulverized and calcined to remove water of hydration, the improvement which comprises removing water from said deflocculated aqueous suspension by introducing it at a pH in the range of 6 to 9.5 and at a solids content less than 45% without previous flocculation and filtration directly into hot exhaust gases from a clay calciner in a venturi-scrubber, thereby to heat and optionally evaporate water from said deflocculated suspension, charging the heated suspension to an electrically augmented vacuum filter operated with alkaline bath overflow and producing an acidic filter cake in excess of 70% solids, mixing said filter cake with alkaline bath overflow and additional deflocculating agent, if necessary, to produce a heated partially dewatered deflocculated slurry containing 50% to 60% solids and, while said slurry is still in heated condition, spray drying it to remove the remainder of the liquid water before pulverization and calcination.

8. The process of claim 7, wherein said electrofilter is an electrically augumented vacuum filter containing a multiplicity of anodes and hollow cathodes, said filter being operated with hot bath overflow and producing a hot acidic filter cake of about 70% to 80% solids which is mixed with hot bath overflow to partially dewater said suspension before spray drying.

9. The process of claim 8, wherein said hot dilute deflocculated aqueous suspension of fine particle-size hydrated kaolin clay contains from about 36% to 41% solids and is dewatered to about 55% to 60% solids in said electrically augmented vacuum filter.

10. The process of claim 7, wherein said dilute deflocculated aqueous suspension is heated to a temperature in the range of about 125° F. to about 140° F. by treatment with said hot exhaust gases.

11. The process of claim 7 wherein said crude clay is a gray Georgia kaolin.

12. The process of claim 1 wherein said crude clay is a gray Georgia kaolin and the said fine size fraction thereof is composed of particles at least 90% by weight of which are finer than 1 micron.

* * * * *